(12) United States Patent
Tanaka et al.

(10) Patent No.: US 12,080,483 B2
(45) Date of Patent: Sep. 3, 2024

(54) METHOD OF PRODUCING MULTILAYER CERAMIC ELECTRONIC COMPONENT, AND MULTILAYER CERAMIC ELECTRONIC COMPONENT

(71) Applicant: Murata Manufacturing Co., Ltd., Nagaokakyo (JP)

(72) Inventors: Yuichiro Tanaka, Nagaokakyo (JP); Hiroki Awata, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 474 days.

(21) Appl. No.: 17/398,051

(22) Filed: Aug. 10, 2021

(65) Prior Publication Data

US 2022/0059289 A1   Feb. 24, 2022

(30) Foreign Application Priority Data

Aug. 18, 2020  (JP) ................. 2020-138055

(51) Int. Cl.
| | |
|---|---|
| H01G 4/30 | (2006.01) |
| B32B 18/00 | (2006.01) |
| B32B 37/10 | (2006.01) |
| H01G 4/008 | (2006.01) |
| H01G 4/012 | (2006.01) |
| H01G 4/12 | (2006.01) |

(52) U.S. Cl.
CPC ............ *H01G 4/30* (2013.01); *B32B 18/00* (2013.01); *B32B 37/10* (2013.01); *H01G 4/008* (2013.01); *H01G 4/012* (2013.01); *H01G 4/1209* (2013.01); *B32B 2457/16* (2013.01)

(58) Field of Classification Search
None
See application file for complete search history.

(56) References Cited

U.S. PATENT DOCUMENTS

| | | | |
|---|---|---|---|
| 2012/0147516 A1* | 6/2012 | Kim ...................... | H01G 4/008 29/25.42 |
| 2012/0229951 A1* | 9/2012 | Kim ........................ | H01G 4/30 29/25.42 |
| 2012/0250220 A1 | 10/2012 | Yamashita et al. | |
| 2015/0179341 A1 | 6/2015 | Tsutsumi | |
| 2017/0018363 A1* | 1/2017 | Tanaka .................. | H01G 4/005 |
| 2017/0243697 A1* | 8/2017 | Mizuno ............... | H01G 4/1227 |

(Continued)

FOREIGN PATENT DOCUMENTS

| | | |
|---|---|---|
| JP | 06-283375 A | 10/1994 |
| JP | 11-162781 A | 6/1999 |

(Continued)

*Primary Examiner* — Michael N Orlando
*Assistant Examiner* — Abhishek A Patwardhan
(74) *Attorney, Agent, or Firm* — Keating & Bennett, LLP

(57) ABSTRACT

A method of producing a multilayer ceramic electronic component includes a lamination step of producing a laminate by laminating green sheets each with an internal electrode layer formed thereon, an isotropic pressing step of subjecting the laminate to isotropic pressing, a flattening step of shaving one or both of main surfaces of the isotropic pressed laminate to flatten the one or both of the main surfaces of the laminate, and a rigid pressing step of pressing the flattened laminate from both of the main surfaces with a rigid body on each of the main surfaces.

14 Claims, 7 Drawing Sheets

(56) References Cited

U.S. PATENT DOCUMENTS

| | | | |
|---|---|---|---|
| 2017/0301470 A1* | 10/2017 | Asai | H01G 4/232 |
| 2017/0301471 A1* | 10/2017 | Ono | H01G 4/224 |
| 2019/0164693 A1* | 5/2019 | Ono | H01G 4/30 |
| 2020/0058443 A1* | 2/2020 | Kang | H01G 4/2325 |
| 2020/0312554 A1* | 10/2020 | Yokomizo | H01G 4/232 |

FOREIGN PATENT DOCUMENTS

| | | |
|---|---|---|
| JP | 2000-012378 A | 1/2000 |
| JP | 2003-133161 A | 5/2003 |
| JP | 2015-026837 A | 2/2015 |
| JP | 2018-113300 A | 7/2018 |
| JP | 2018-133441 A | 8/2018 |
| WO | 2011/071143 A1 | 6/2011 |

* cited by examiner

METHOD OF PRODUCING MULTILAYER CERAMIC ELECTRONIC COMPONENT, AND MULTILAYER CERAMIC ELECTRONIC COMPONENT

CROSS REFERENCE TO RELATED APPLICATIONS

This application claims the benefit of priority to Japanese Patent Application No. 2020-138055 filed on Aug. 18, 2020. The entire contents of this application are hereby incorporated herein by reference.

BACKGROUND OF THE INVENTION

1. Field of the Invention

The present invention relates to a method of producing a multilayer ceramic electronic component and a multilayer ceramic electronic component.

2. Description of the Related Art

A method of producing a multilayer ceramic capacitor is disclosed, for example, in JP 2018-113300 A. The method includes a lamination step of producing a laminate by laminating green sheets each with an internal electrode layer formed thereon, and a compression step of compression bonding the laminate in the lamination direction with a first elastic sheet on the top surface of the laminate in the lamination direction and a second elastic sheet on the bottom surface of the laminate in the lamination direction.

The laminate alternately includes portions with the internal electrode layer and portions without the internal electrode layer. The portions without the internal electrode layer each have a thickness that is smaller by the quantity of a step calculated from the formula (the thickness of each internal electrode layer×the number of internal electrode layers laminated).

The method of JP 2018-113300 A is described to enable an elastic sheet to conform to such steps and come into contact with the portions without the internal electrode layer.

FIG. 6 of JP 2018-113300 A shows that compression bonding using elastic sheets makes dents in the portions without the internal electrode layer.

As shown in FIG. 6 of JP 2018-113300 A, when the portions without the internal electrode layer are dented, the internal electrode layers, particularly the internal electrode layers at the upper surface and the lower surface of the laminate in the lamination direction, are curved at the ends toward the center of the laminate in the lamination direction along the dents in the portions without the internal electrode layer.

Such curves cause the distance from the curved portion of an internal electrode layer to the adjacent internal electrode layer to change, which may affect the capacitance.

JP 2018-113300 A also discloses that rigid pressing is performed after the compression bonding using elastic sheets. When rigid pressing is performed on the laminate in which the portions without the internal electrode layer are dented, the lack of pressure in the boundaries between the ends of the internal electrode layers and the dielectric ceramic layers may lead to the formation of voids in the boundaries between the ends of the internal electrode layers and the dielectric ceramic layers. These voids may also affect the capacitance. Entry of moisture in such a void can cause a defect in the ceramic electronic component.

Although FIG. 6 of JP 2018-113300 A shows internal electrode layers in straight lines without the curves, this drawing fails to show the exact shapes of the internal electrode layers. FIG. 6 of JP 2018-113300 A also fails to show voids formed in the boundaries between the ends of the internal electrode layers and the dielectric ceramic layers.

FIG. 1 is a schematic cross-sectional view of a laminate showing a cross section including the lamination direction and the width direction with the curved shapes of some internal electrode layers shown in detail.

FIG. 1 shows that in a cross section of a laminate 210, dielectric ceramic layers 220 and internal electrode layers 230 are laminated alternately.

An internal electrode layer 231 positioned near the upper surface of the laminate 210 in the lamination direction (the direction indicated by the arrow T in FIG. 1) is curved at the right end and left end of the laminate 210 in the width direction (the direction indicated by the arrow W in FIG. 1) toward the center of the laminate 210 in the lamination direction (the downward direction in FIG. 1).

An internal electrode layer 232 positioned near the lower surface of the laminate 210 in the lamination direction is curved at the right end and left end of the laminate 210 in the width direction toward the center of the laminate in the lamination direction (the upward direction in FIG. 1).

An internal electrode layer 233 positioned near the center of the laminate 210 in the lamination direction is not curved throughout the laminate 210 in the width direction.

FIG. 1 also shows voids 240 formed in the boundaries between the ends of each of the internal electrode layer 231, internal electrode layer 232, and internal electrode layer 233 and the dielectric ceramic layers 220.

SUMMARY OF THE INVENTION

Preferred embodiments of the present invention provide methods of producing multilayer ceramic electronic components, and multilayer ceramic electronic components, in each of which the internal electrode layers are less likely to be curved and voids are less likely to be provided in the boundaries between the ends of the internal electrode layers and the dielectric ceramic layers.

A method of producing a multilayer ceramic electronic component according to a preferred embodiment of the present invention includes a lamination step of producing a laminate by laminating green sheets each including an internal electrode layer provided thereon; an isotropic pressing step of subjecting the laminate to isotropic pressing; a flattening step of shaving one or both of main surfaces of the isotropic pressed laminate to flatten the one or both of the main surfaces of the laminate; and a rigid pressing step of pressing the flattened laminate from both of the main surfaces with a rigid body on each of the main surfaces.

A multilayer ceramic electronic component according to a preferred embodiment of the present invention includes a laminate including dielectric ceramic layers and internal electrode layers laminated together in a lamination direction, the laminate including a first main surface and a second main surface that oppose each other in the lamination direction, a first side surface and a second side surface that oppose each other in a width direction perpendicular or substantially perpendicular to the lamination direction, and a first end surface and a second end surface that oppose each other in a length direction perpendicular or substantially perpendicular to the lamination direction and the width direction, the internal electrode layers including a first internal electrode layer that extends to the first end surface and a second internal electrode layer that opposes the first internal electrode layer with a dielectric ceramic layer in between and extends to the second end surface, wherein in a cross section of the laminate including the lamination direction and the width direction, no void is provided in a boundary between an end of each of the internal electrode layers in the width direction and the dielectric ceramic layer.

A multilayer ceramic electronic component according to a preferred embodiment of the present invention includes a multilayer ceramic electronic component including a laminate including dielectric ceramic layers and internal electrode layers laminated together in a lamination direction, the laminate including a first main surface and a second main surface that oppose each other in the lamination direction, a first side surface and a second side surface that oppose each other in a width direction perpendicular or substantially perpendicular to the lamination direction, and a first end surface and a second end surface that oppose each other in a length direction perpendicular or substantially perpendicular to the lamination direction and the width direction, the internal electrode layers including a first internal electrode layer that extends to the first end surface and a second internal electrode layer that opposes the first internal electrode layer with a dielectric ceramic layer in between and extends to the second end surface, wherein in a cross section of the laminate including the lamination direction and the width direction, a ratio of a flatness D1 to a width W1 is about 0.10 or less, where the flatness D1 is a flatness in the lamination direction of an internal electrode layer at an outermost position of the laminate in the lamination direction and is measured throughout the internal electrode layer in the width direction, and the width W1 is a width of the internal electrode layer, a ratio of a step D2 to the width W1 is about 0.06 or less, where the step D2 is a distance between an outermost position and a position closest to the internal electrode layers in the lamination direction on the first main surface or second main surface of the laminate, and the step D2 is about 70 μm or less.

Preferred embodiments of the present invention are each able to provide methods of producing multilayer ceramic electronic components, and multilayer ceramic electronic components, in each of which the internal electrode layers are less likely to be curved and voids are less likely to be provided in the boundaries between the ends of the internal electrode layers and the dielectric ceramic layers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Methods of producing multilayer ceramic electronic components according to preferred embodiments of the present invention and multilayer ceramic electronic components according to preferred embodiments of the present invention are described below with reference to the drawings.

The present invention is not limited to the following preferred embodiments, and may be suitably modified without departing from the gist of the present invention. Combinations of two or more preferred features described in the following preferred embodiments are also within the scope of the present invention.

The following describes an example of a case of producing a multilayer ceramic capacitor to describe a method of producing a multilayer ceramic electronic component according to a preferred embodiment of the present invention and a multilayer ceramic electronic component according to a preferred embodiment of the present invention.

Figure 2:
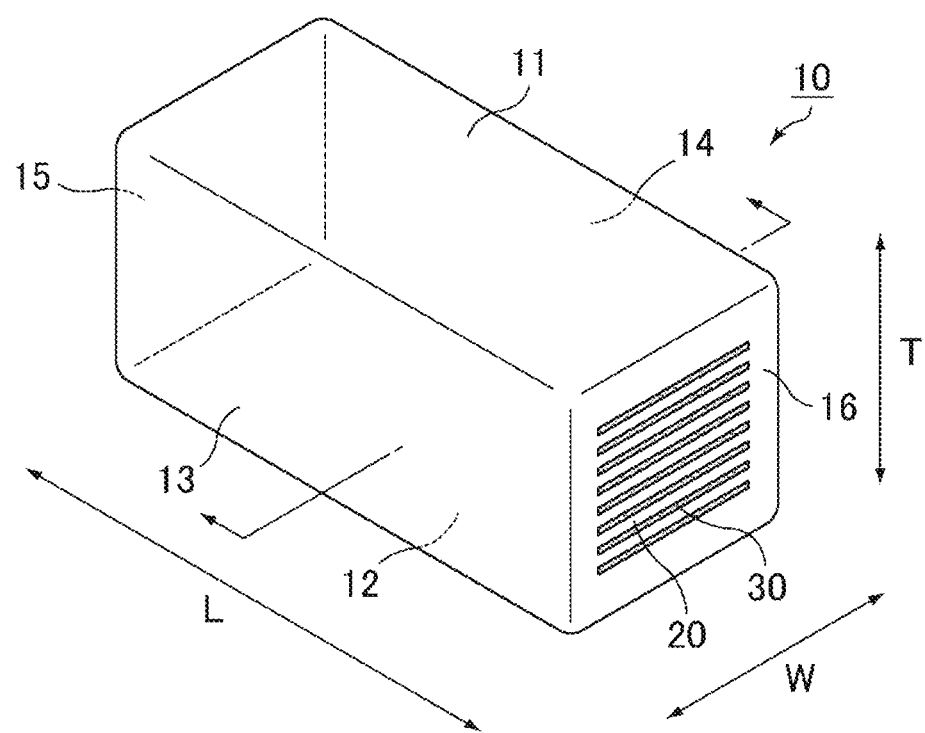
FIG. 2 is a perspective view schematically showing an example of a laminate defining a multilayer ceramic capacitor according to a preferred embodiment of the present invention.
Figure 3:
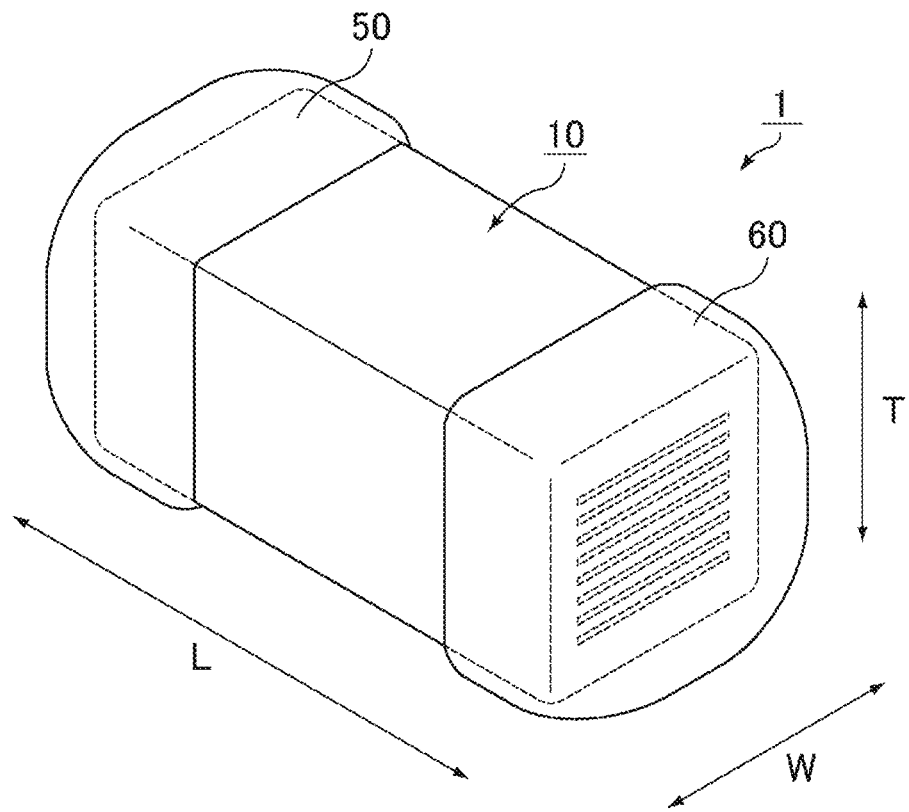
FIG. 3 is a perspective view schematically showing an example of a multilayer ceramic capacitor according to a preferred embodiment of the present invention.

First, with reference to FIG. 2 and FIG. 3, a laminate and external electrodes defining a multilayer ceramic capacitor are described.

FIG. 2 is a perspective view schematically showing an example of a laminate defining a multilayer ceramic capacitor according to a preferred embodiment of the present invention. FIG. is a perspective view schematically showing an example of a multilayer ceramic capacitor according to a preferred embodiment of the present invention.

In the multilayer ceramic capacitor and the laminate, the length direction, the width direction, and the lamination direction are respectively the directions indicated by the double-headed arrows L, W, and T in a laminate 10 shown in FIG. 2 and a multilayer ceramic capacitor 1 shown in FIG. 3. Here, the length direction, the width direction, and the lamination direction are perpendicular or substantially perpendicular to one another. The lamination direction refers to a direction in which dielectric ceramic layers 20 and internal electrode layers 30 defining the laminate 10 are stacked.

The length direction refers to a direction in which a first external electrode 50 and a second external electrode 60, which are the external electrodes defining the multilayer ceramic capacitor 1, oppose each other (see FIG. 3).

In the laminate 10 shown in FIG. 2 and the multilayer ceramic capacitor 1 shown in FIG. 3, the dimension in the length direction is larger than the dimension in the width direction. However, in the multilayer ceramic electronic component and laminate, the relationship between the dimension in the length direction and the dimension in the width direction is not limited. The dimension in the length direction may be larger or smaller than the dimension in the width direction.

The laminate 10 is a rectangular or substantially rectangular cuboid including six surfaces and including the dielectric ceramic layers 20 and the internal electrode layers 30 laminated together. The laminate 10 includes a first main surface 11 and a second main surface 12 that oppose each other in the lamination direction T indicated by the double-headed arrow T in FIG. 2, a first side surface 13 and a second side surface 14 that oppose each other in the width direction W indicated by the double-headed arrow W and perpendicular or substantially perpendicular to the lamination direction T, and a first end surface 15 and a second end surface 16 that oppose each other in the length direction L indicated by the double-headed arrow L and perpendicular or substantially perpendicular to the lamination direction T and the width direction W.

Herein, a cross section of the laminate 10 that is perpendicular or substantially perpendicular to the first end surface 15 and the second end surface 16 and parallel or substantially parallel to the lamination direction of the laminate 10 is referred to as a LT cross section. A cross section of the laminate 10 that is perpendicular or substantially perpendicular to the first side surface 13 and the second side surface 14 and parallel or substantially parallel to the lamination direction of the laminate 10 is referred to as a WT cross section.

Also, a cross section of the laminate 10 that is perpendicular or substantially perpendicular to the first side surface 13, the second side surface 14, the first end surface 15, and the second end surface 16 and perpendicular or substantially perpendicular to the lamination direction of the laminate 10 is referred to as a LW cross section.

The internal electrode layers include a first internal electrode layer and a second internal electrode layer laminated together. The first internal electrode layer extends to the first end surface, and the second internal electrode layer extends to the second end surface. Capacitance occurs in an electrode opposing portion where the first internal electrode layer and the second internal electrode layer oppose each other with a dielectric ceramic layer in between.

In other words, the laminate includes at least one pair of a first internal electrode layer and a second internal electrode layer and a dielectric ceramic layer which define a capacitor. The dielectric ceramic layer is disposed between the first internal electrode layer and the second internal electrode layer.

Figure 4:
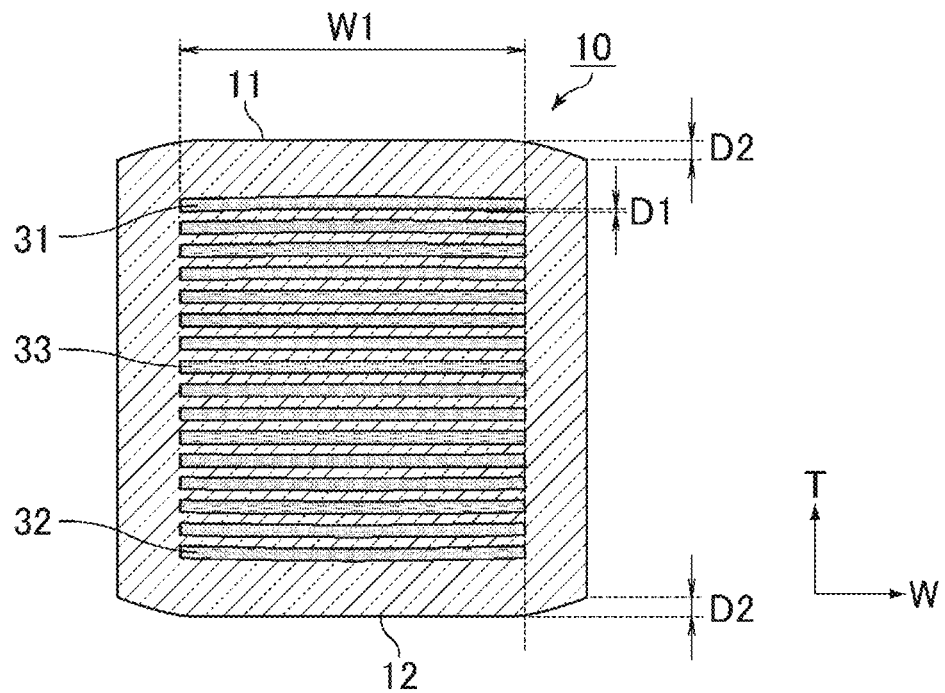
FIG. 4 is a schematic cross-sectional view of a laminate according to a preferred embodiment of the present invention showing a cross section including the lamination direction and the width direction.

FIG. 4 is a schematic cross-sectional view of a laminate showing a cross section including the lamination direction and the width direction.

Figure 1:
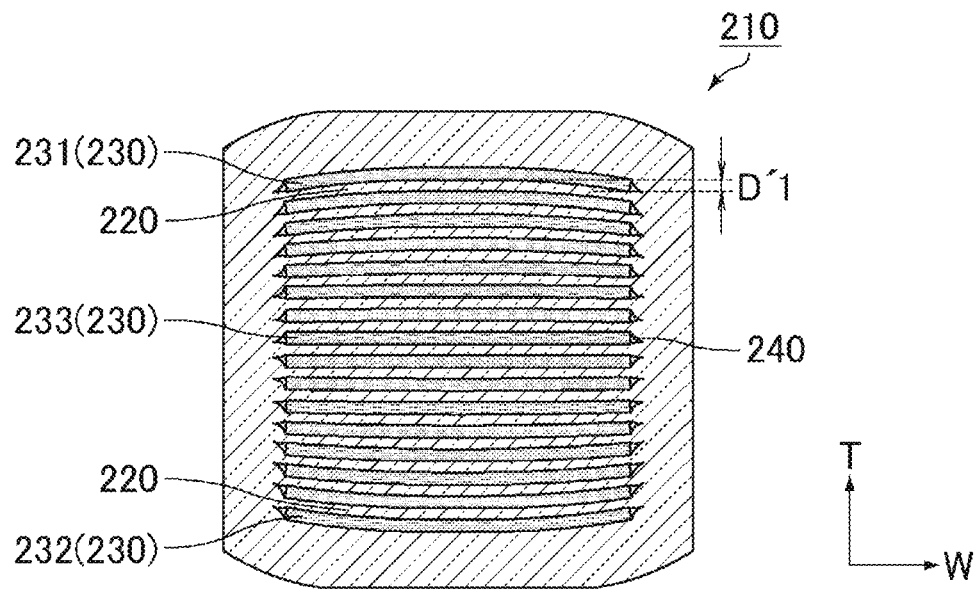
FIG. 1 is a schematic cross-sectional view of a laminate showing a cross section including the lamination direction and the width direction with the curved shapes of some internal electrode layers depicted in detail.

In the laminate 10 defining a multilayer ceramic electronic component according to a preferred embodiment of the present invention, no void is provided in a boundary between an end of each of the internal electrode layers 30 in the width direction and a dielectric ceramic layer 20 in a cross section of the laminate 10 including the lamination direction and the width direction (WT cross section). This means that voids, such as voids 240 in the boundaries between the ends of the internal electrode layers 230 in the width direction and the dielectric ceramic layers 220 shown in FIG. 1 are not provided.

Since no voids are provided between the ends of the internal electrode layers and the dielectric ceramic layers, the characteristic values of the multilayer ceramic electronic component are stable without being affected by voids.

Herein, the expression "no voids are provided" between the ends of the internal electrode layers and the dielectric ceramic layers means that in a WT cross section of the laminate, no voids due to interlayer peeling of a layer laminated between an end of each internal electrode layer and a dielectric ceramic layer or the like is observed in an electron microscopic photograph taken at 500× magnification.

In a cross section of a laminate including the lamination direction and the width direction in a multilayer ceramic electronic component according to a preferred embodiment of the present invention, a flatness D1 is preferably, for example, about 20 μm or less, and more preferably about 10 μm or less, where the flatness D1 is a flatness in the lamination direction of an internal electrode layer at an outermost position of the laminate in the lamination direction and is measured throughout the internal electrode layer in the width direction.

The flatness D1 is a dimension indicated by the double-headed arrow D1 in FIG. 4, and is calculated by, on the same surface (side in a cross-sectional view) in the lamination direction of one internal electrode layer 31 (or internal electrode layer 32) at the outermost position of the laminate 10 in the lamination direction, taking a point closest to the center in the lamination direction and a point at the outermost position in the lamination direction, and drawing parallel lines from the respective two points in the width direction to thus determine the distance between the two parallel lines.

Usually, the point closest to the center in the lamination direction of the laminate is taken near an end of the internal electrode layer in the width direction, while the point at the outermost position of the laminate in the lamination direction is taken near the center of the internal electrode layer in the width direction. In a cross section of the laminate including the lamination direction and the width direction, the shape of the internal electrode layer at the outermost position of the laminate in the lamination direction is a convex warped shape, with the center portion of the internal electrode layer being closer to the outer surface of the laminate than the ends of the internal electrode layer are.

FIG. 1 also shows a flatness D'1 in the same manner. Comparison between FIG. 1 and FIG. 4 shows that the flatness D1 in FIG. 4 is smaller than the flatness D'1 in FIG. 1, and the internal electrode layers in FIG. 4 have a flatter shape.

The flatness D1 may be, for example, about 1 μm or more.

The internal electrode layer 31 is one of the internal electrode layers which is positioned near the upper surface of the laminate 10 in the lamination direction. The internal electrode layer 32 is one of the internal electrode layers which is positioned near the lower surface of the laminate 10 in the lamination direction.

An internal electrode layer 33 is one of the internal electrode layers positioned near the center of the laminate 10 in the lamination direction. This internal electrode layer 33 has an entirely or substantially entirely flat shape in the width direction.

In a cross section of the laminate including the lamination direction and the width direction in the multilayer ceramic electronic component, the ratio of a flatness D1 to a width W1 is preferably, for example, about 0.10 or less, where the flatness D1 is a flatness in the lamination direction of the internal electrode layer at the outermost position of the laminate in the lamination direction and is measured throughout the internal electrode layer in the width direction, and the width W1 is the width of the internal electrode layer.

The width W1 of the internal electrode layer is a dimension indicated by the double-headed arrow W1 in FIG. 4, and is a length in the width direction of the internal electrode layer. The ratio (D1/W1) is an index of smallness of the warpage of the internal electrode layer at the outermost position of the laminate.

The ratio is more preferably about 0.08 or less, and may be about 0.01 or more, for example.

In a cross section of the laminate including the lamination direction and the width direction in the multilayer ceramic electronic component, the ratio of a step D2 to a width W1 is preferably, for example, about 0.06 or less, where the step D2 is the distance between the outermost position and the position closest to the internal electrode layers in the lamination direction on the first main surface or second main surface of the laminate, and the width W1 is the width of the internal electrode layer.

FIG. 4 shows the step D2 which is the distance between the outermost position and the position closest to the internal electrode layers in the lamination direction on a first main surface 11 of the laminate 10, and is indicated by the double-headed arrow D2.

In a WT cross section of the laminate, the first main surface and second main surface of the laminate each are not a perfectly flat surface and thus have a varying step D2. The step D2 is determined at the midpoint of the laminate in the L direction.

The ratio (D2/W1) is also an index of smallness of warpage of the internal electrode layer at the outermost position of the laminate.

The ratio is more preferably about 0.04 or less, and may be about 0.01 or more, for example.

In a cross section of the laminate including the lamination direction and the width direction in the multilayer ceramic electronic component, a step D2 is preferably, for example, about 70 μm or less, where the step D2 is the distance between the outermost position and the position closest to the internal electrode layers in the lamination direction on the first main surface or second main surface of the laminate.

Here, in a plan view of the first main surface, the region where capacitance is produced by internal electrode layers that are at different electric potentials and oppose each other with a dielectric layer in between in the lamination direction is referred to as the effective region, the regions where the internal electrode layers electrically connected to the corresponding external electrode, extending from the effective region, and being at the same electric potential oppose each other with a dielectric layer in between in the lamination direction are referred to as electrode lead-out regions, and the region that is outside the effective region and includes no electrode lead-out region is referred to as the surrounding region. Typically, the step D2 in the multilayer ceramic electronic component is positioned in the electrode lead-out regions and the surrounding region where the conditions such as the number of the internal electrode layers and the dielectric layers laminated are different from those in the effective region. When the step D2 is measured by a simplified method, the step D2 may be the distance between the position closest to the internal electrode layer and the position farthest from the internal electrode layer in the lamination direction on the first main surface or second main surface in the electrode lead-out regions and the surrounding region of the laminate. Decreasing the step D2 increases the distance from each main surface of the laminate to the effective region, so that the distance from the internal electrode layer to the main surface is maintained. Thus, entry of moisture, for example, from the outside can be reduced or prevented, and the reliability can be improved. Also, decreasing the step D2 makes a larger internal space for internal electrode layer formation. Accordingly, in the case of the laminates with the same outer dimensions, the one with a smaller step D2 can have a larger effective region, achieving a larger magnitude of capacitance per volume.

The "one internal electrode layer at the outermost position of the laminate in the lamination direction" is the internal electrode layer near the upper surface (closer to the first main surface) or near the lower surface (closer to the second main surface) among the internal electrode layers defining the laminate, and is the internal electrode layer whose ends in the width direction are most likely to be dented by compression bonding. Which of the internal electrode layer near the upper surface and the internal electrode layer near the lower surface is the "outermost" one can be determined based on the shortest distance, i.e., the step D2, between the first main surface or second main surface and the corresponding internal electrode layer.

In calculation of the flatness D1, in the case where which of the internal electrode layer near the upper surface and the internal electrode layer near the lower surface is the "outermost" one is difficult to determine, the flatness D1 of each of these internal electrode layers may be calculated and the average of the flatness D1 values may be used.

Figure 5:
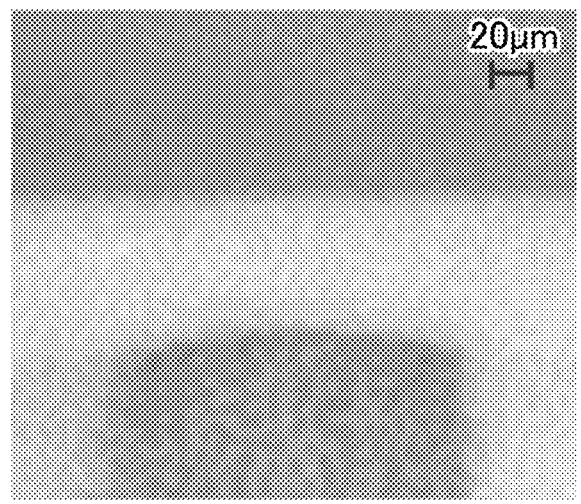
FIG. 5 is an example of a cross-sectional photograph of a laminate according to a preferred embodiment of the present invention.
Figure 6:
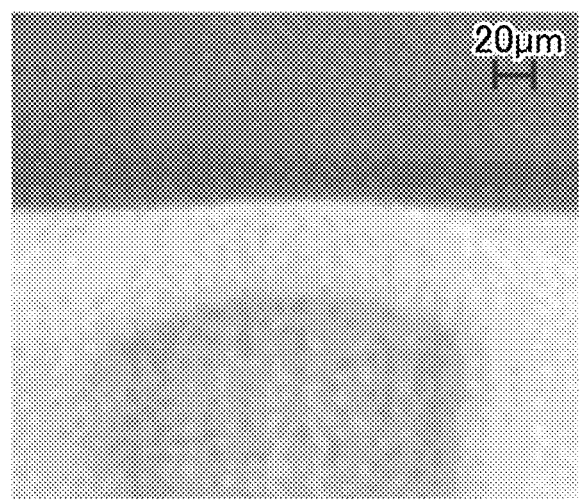
FIG. 6 is an example of a cross-sectional photograph of a laminate corresponding to a conventional art.

FIG. 5 is an example of a cross-sectional photograph of a laminate according to a preferred embodiment of the present invention. FIG. 6 is an example of a cross-sectional photograph of a laminate corresponding to a conventional art.

These photographs were taken using a digital microscope with a magnification of ×200 and a bright field.

The laminate shown in FIG. 5 includes flatter internal electrode layers than the laminate shown in FIG. 6.

Hereinabove, values such as the flatness D1 of the internal electrode layers in the lamination direction in a WT cross section of a laminate have been defined. Here, values such as the flatness of internal electrode layers in the lamination direction in a LT cross section of the laminate may be defined.

Figure 7:
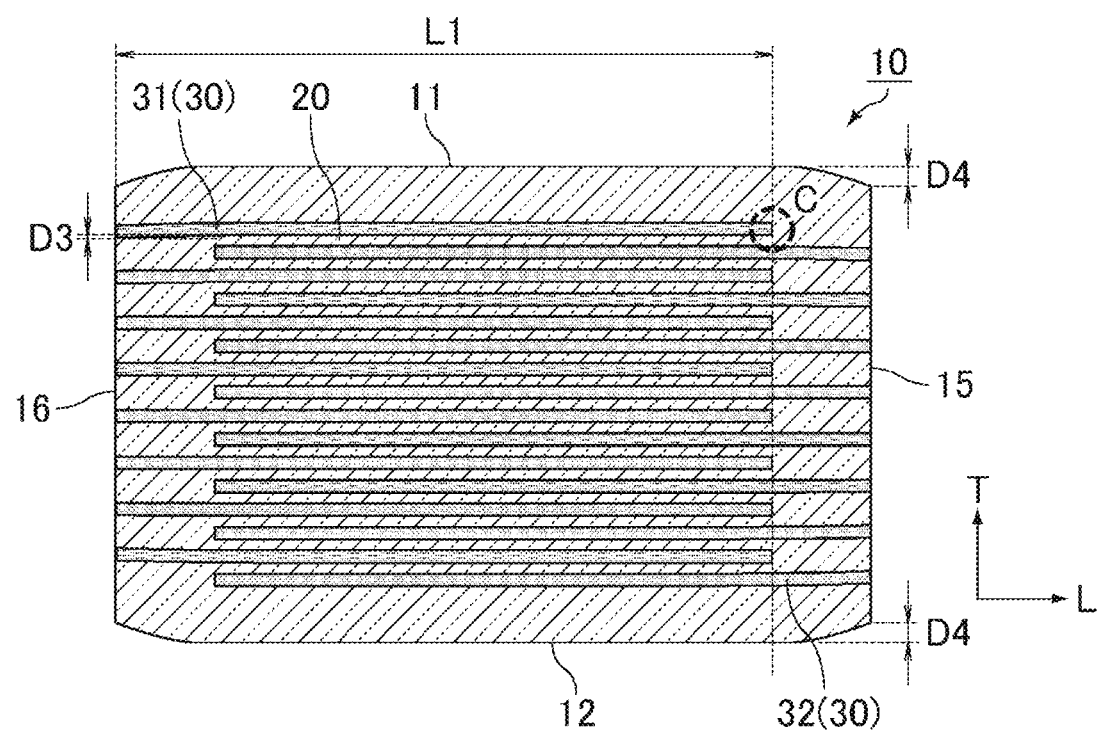
FIG. 7 is a schematic cross-sectional view of a laminate according to a preferred embodiment of the present invention showing a cross section including the lamination direction and the length direction.

FIG. 7 is a schematic cross-sectional view of a laminate showing a cross section including the lamination direction and the length direction.

FIG. 7 shows the state where, in a LT cross section of the laminate 10, the first internal electrode layers among the internal electrode layers 30 extend to the first end surface 15 of the laminate and the second internal electrode layers extend to the second end surface 16 of the laminate.

In the LT cross section of the laminate, no void is preferably provided in a boundary between an end of each of the internal electrode layers 30 in the length direction and a dielectric ceramic layer 20. The boundary between an end of each of the internal electrode layers 30 in the length direction and a dielectric ceramic layer 20 in the LT cross section means the region surrounded by the dotted line C in FIG. 7. Preferably, no void is provided in this region.

In a cross section of the laminate including the lamination direction and the length direction in a multilayer ceramic electronic component, a flatness D3 is preferably, for example, about 20 μm or less, and more preferably about 10 μm or less, where the flatness D3 is a flatness in the lamination direction of the internal electrode layer at the outermost position of the laminate in the lamination direction and is measured throughout the internal electrode layer in the length direction.

The flatness D3 is a dimension indicated by the double-headed arrow D3 in FIG. 7, and is calculated by, on the same surface (side in a cross-sectional view) in the lamination direction of one internal electrode layer 31 at the outermost position of the laminate 10 in the lamination direction, taking a point closest to the center in the lamination direction and a point at the outermost position in the lamination direction, and drawing parallel lines from the respective two points in the length direction to thus determine the distance between the two parallel lines.

Usually, the point closest to the center in the lamination direction of the laminate is taken near an end of the laminate where the internal electrode layer is exposed to the end surface, while the point at the outermost position of the laminate in the lamination direction is taken near the center of the internal electrode layer in the length direction.

In a cross section of the laminate including the lamination direction and the length direction, the shape of the internal electrode layer at the outermost position of the laminate in the lamination direction is a convex warped shape, with the center portion of the internal electrode layer being closer to the outer surface of the laminate than the ends of the internal electrode layer are.

The flatness D3 may be, about 1 μm or more, for example.

In a cross section of the laminate including the lamination direction and the length direction in the multilayer ceramic electronic component, the ratio of a flatness D3 to a length L1 is preferably, for example, about 0.10 or less, where the flatness D3 is a flatness in the lamination direction of the internal electrode layer at the outermost position of the laminate in the length direction and is measured throughout the internal electrode layer, and the length L1 is the length of the internal electrode layer.

The length L1 of the internal electrode layer is a dimension indicated by the double-headed arrow L1 in FIG. 7, and is a length in the length direction of the internal electrode layer. The ratio (D3/L1) is an index of smallness of the warpage of the internal electrode layer at the outermost position of the laminate.

The ratio is more preferably, for example, about 0.08 or less, and may be about 0.01 or more.

In a cross section of the laminate including the lamination direction and the length direction in the multilayer ceramic electronic component, the ratio of a step D4 to a length L1 is preferably, for example, about 0.06 or less, where the step D4 is the distance between the outermost position and the position closest to the internal electrode layers in the lamination direction on the first main surface or second main surface of the laminate, and the length L1 is the length of the internal electrode layer.

FIG. 7 shows the step D4 which is the distance between the outermost position and the position closest to the internal electrode layers in the lamination direction on the first main surface 11 of the laminate 10, and is indicated by the double-headed arrow D4.

In a LT cross section of the laminate, the first main surface and second main surface of the laminate each are not a perfectly flat surface and thus have a varying step D4. The step D4 is determined at the midpoint of the laminate in the W direction.

The ratio (D4/L1) is also an index of smallness of warpage of the internal electrode layer at the outermost position of the laminate.

The ratio is more preferably, for example, about 0.04 or less, and may be about 0.01 or more.

In a cross section of the laminate including the lamination direction and the length direction in the multilayer ceramic electronic component, a step D4 is preferably, for example, about 70 μm or less, where the step D4 is the distance between the outermost position and the position closest to the internal electrode layers in the lamination direction on the first main surface or second main surface of the laminate.

The step D4 is as defined above. When the multilayer ceramic electronic component is a multilayer ceramic capacitor, as with the step D2 above, a multilayer ceramic electronic component having a small step D4 or a low ratio (D4/L1) of the step D4 to the length L1 of the internal electrode layer can improve the reliability or achieve a large magnitude of capacitance per volume.

Next, a non-limiting example of a method of producing a multilayer ceramic electronic component according to a preferred embodiment of the present invention which can produce the multilayer ceramic electronic component described above is described.

First, green sheets each including an internal electrode layer formed thereon are prepared.

A ceramic slurry including mixed materials, such as, for example, a ceramic for dielectric ceramic layer formation, an organic material, and a solvent is applied in a sheet shape to a carrier film such as, for example, a PET film by a method such as, for example, spray coating, die coating, or screen printing, so that green sheets are obtained.

A conductive paste for internal electrode layer formation including a metal material such as Ni powder, a solvent, a dispersant, and a binder, for example, is prepared. The conductive paste for internal electrode layer formation is printed on each green sheet by a method such as screen printing or gravure printing, for example, such that patterned internal electrodes are formed.

Thus, the green sheets each including an internal electrode layer formed thereon are prepared.

The ceramic for dielectric ceramic layer formation includes a ceramic material with a main component of, for example, barium titanate ($BaTiO_3$), calcium titanate ($CaTiO_3$), strontium titanate ($SrTiO_3$), or calcium zirconate ($CaZrO_3$). The ceramic material may include Mn, Mg, Si, Co, Ni, or a rare earth material, for example, as an accessory component in an amount smaller than the amount of the main component.

Examples of the organic material in the ceramic slurry include binders such as polyvinyl butyral-based binders and phthalic ester-based binders.

The green sheets each preferably have a thickness of about 0.5 μm or more and about 1.2 μm or less, for example.

The conductive paste for internal electrode layer formation preferably includes a metal material such as Ni, Cu, Ag, Pd, an Ag—Pd alloy, or Au, for example. The conductive paste also preferably includes a dielectric material having the same or similar composition as the ceramic material included in the green sheets.

Each internal electrode layer formed on a green sheet preferably has a thickness of about 0.2 μm or more and about 1.5 μm or less, for example. The internal electrode layers each having a thickness of about 0.2 μm or more, for example, have improved continuity, thus forming sufficient capacitance. The internal electrode layers each having a thickness of about 1.5 μm or less, for example, achieve sufficient cohesion between the green sheets, thus preventing structural defects such as delamination.

The green sheets each with an internal electrode layer formed thereon are laminated, so that a laminate is produced.

This process is the lamination step.

When the multilayer ceramic electronic component is a multilayer ceramic capacitor, the number of laminated green sheets each with an internal electrode layer formed thereon is preferably about 50 or more and about 500 or less, for example.

In production of the laminate, preferably, patterned internal electrode layers of the green sheets of two types, i.e., patterned internal electrodes of two types, are alternately laminated.

In practice, multi-patterned green sheets on each of which patterned internal electrodes are repeatedly formed are produced, and the green sheets are laminated such that the patterned internal electrodes are shifted from each other.

Figure 8:
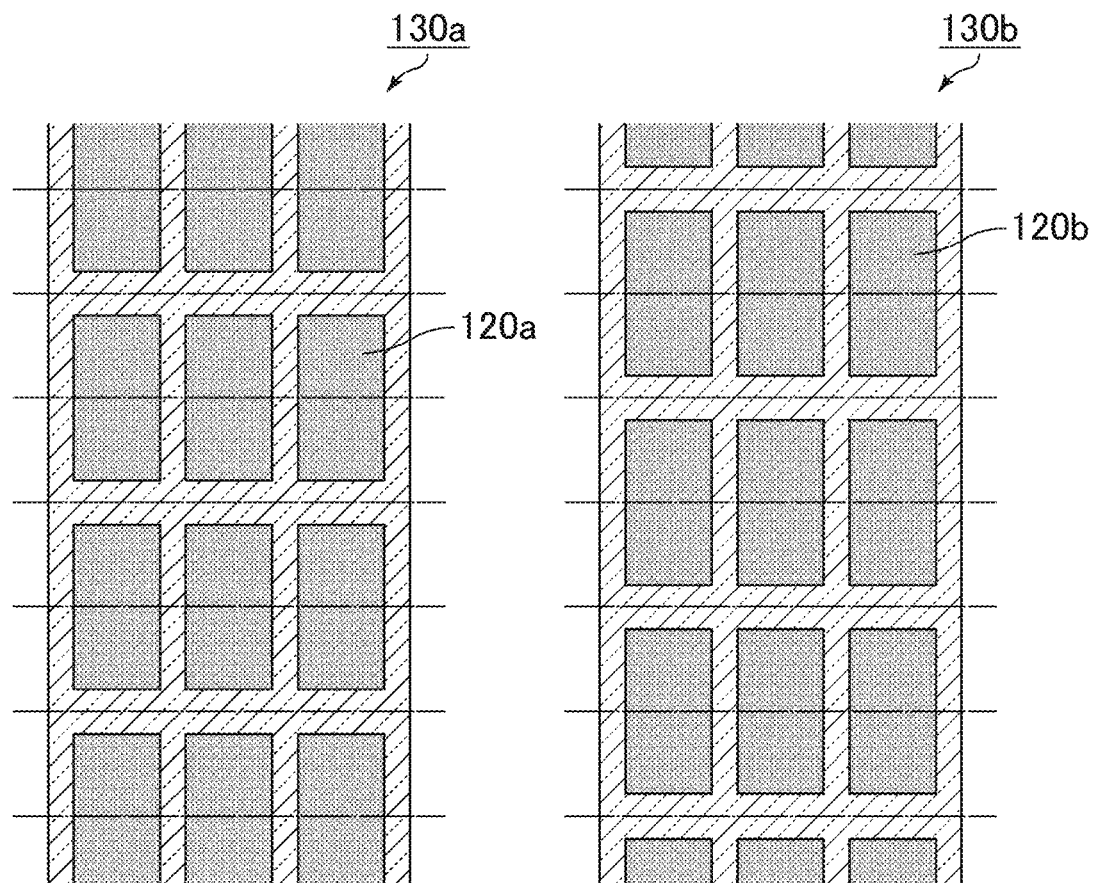
FIG. 8 is a top view schematically showing an example of multi-patterned green sheets according to a preferred embodiment of the present invention.

FIG. 8 is a top view schematically showing an example of multi-patterned green sheets according to a preferred embodiment of the present invention.

FIG. 8 shows a green sheet 130*a* with an internal electrode layer 120*a* formed thereon and a green sheet 130*b* with an internal electrode layer 120*b* formed thereon. When green sheets 130*a* and green sheets 130*b* are alternately laminated and the resulting laminate is cut along the dotted lines, the internal electrode layers 120*a* of the green sheets 130*a* or the internal electrode layers 120*b* of the green sheets 130*b* are exposed on each cross section.

Figure 9:
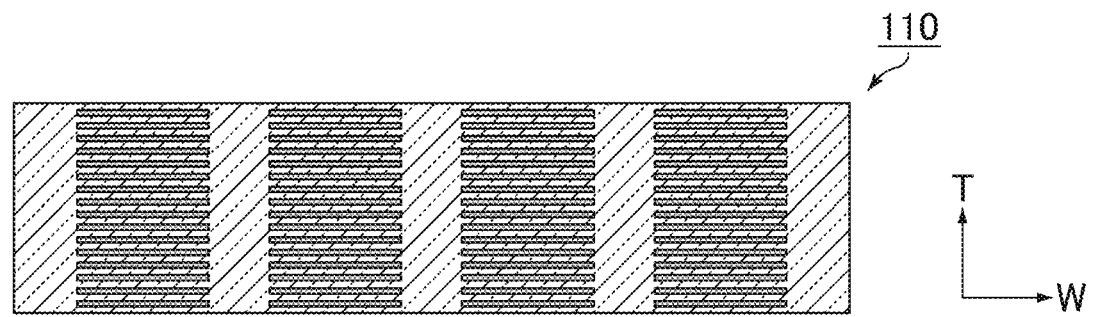
FIG. 9 is a cross-sectional view schematically showing a laminate of green sheets according to a preferred embodiment of the present invention each including an internal electrode layer provided thereon.

FIG. 9 is a cross-sectional view schematically showing a laminate of green sheets each with an internal electrode layer formed thereon.

The cross-sectional views of FIG. 9 and the subsequent drawings each show a cross section to be a WT cross section of a multilayer ceramic electronic component according to a preferred embodiment of the present invention.

FIG. 9 shows a laminate 110. The laminate 110 is a laminate of the green sheets 130 each with an internal electrode layer 120 formed thereon.

In the lamination step, preferably, an outer green sheet without the internal electrode layer is formed on at least one main surface of the laminate.

Figure 10:
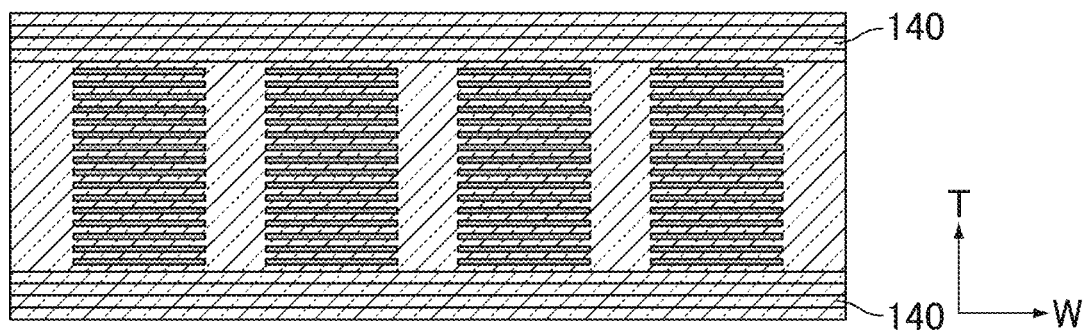
FIG. 10 is a cross-sectional view schematically showing the state where outer green sheets are laminated on each main surface of a laminate according to a preferred embodiment of the present invention.

FIG. 10 is a cross-sectional view schematically showing the state where outer green sheets are laminated on each main surface of a laminate.

FIG. 10 shows the state where outer green sheets 140 are laminated on each main surface of the laminate 110.

Each outer green sheet is subjected to partial or entire shaving in the subsequent flattening step. Thus, the outer green sheet(s) is/are preferably laminated such that the sheet(s) has/have a thickness obtained by adding a thickness to be shaved in the flattening step to the dielectric ceramic layer disposed outside the internal electrode layer at the outermost position of the multilayer ceramic electrode component.

The number of outer green sheets to be laminated is not limited. The thickness of each outer green sheet is not limited either.

The ceramic defining the outer green sheets is preferably of the same or substantially the same as the ceramic defining the dielectric ceramic layers.

Subsequently, the laminate is subjected to isotropic pressing.

This process is the isotropic pressing step.

The isotropic pressing can be cold isotropic pressing (CIP), for example.

In isotropic pressing, preferably, an elastic sheet is disposed on each main surface of the laminate, and the laminate is compression bonded.

The elastic sheet may be made of any material. Specific examples of the material include rubber materials such as styrene butadiene rubber, isoprene rubber, butadiene rubber, chloroprene rubber, acrylonitrile butadiene rubber, butyl rubber, ethylene propylene rubber, ethylene propylene diene rubber, urethane rubber, silicone rubber, fluorine rubber, acrylic rubber, epichlorohydrin rubber, polysulfide rubber, and chlorosulfonated polyethylene rubber.

The specific examples also include resin materials such as polyethylene, polystyrene, and polyurethane.

Preferred among these materials is silicone rubber, for example.

Figure 11:
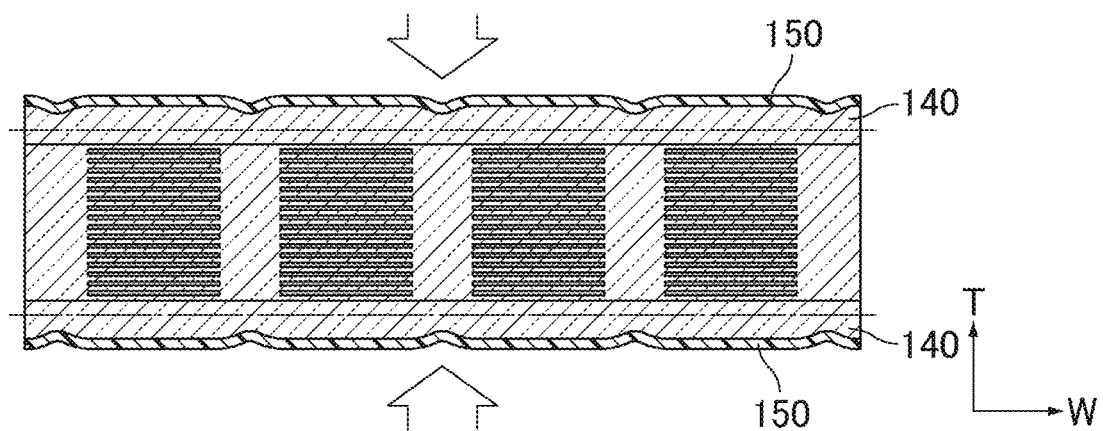
FIG. 11 is a cross-sectional view schematically showing an isotropic pressing step according to a preferred embodiment of the present invention.

FIG. 11 is a cross-sectional view schematically showing an isotropic pressing step.

FIG. 11 shows isotropic pressing performed by disposing the elastic sheet 150 on each main surface of the laminate 110 provided with the outer green sheets 140.

The isotropic pressing makes dents in the portions without the internal electrode layer 120 on the main surfaces of the laminate 110.

The thickness of each dent is preferably within the range of the thickness of each outer green sheet 140. In this case, the dents do not affect the portions including the internal electrode layer, so that the internal electrode layers are prevented from curving along the dents toward the center of the laminate in the lamination direction.

Next, the flattening step is performed which includes shaving one or both of main surfaces of the isotropic pressed laminate to flatten the one or both of the main surfaces of the laminate.

In the flattening step, preferably, each outer green sheet is partially or entirely shaved to flatten the main surface(s) of the laminate.

The flattening step eliminates the dents in the main surface(s) of the laminate formed in the isotropic pressing step.

When an outer green sheet is laminated in the lamination step, the portion to be actually shaved in shaving of the main surface of the laminate in the flattening step is a portion of the outer green sheet.

FIG. 11 shows a laminate with dents in both of main surfaces of the laminate 110 formed by the isotropic pressing. In such a case, both of the main surfaces of the laminate are flattened.

When the dents are formed only in one main surface of the laminate after the isotropic pressing, the one main surface of the laminate alone may be flattened.

In the flattening step, preferably, the main surfaces of the flattened laminate have a flatness of about 15 μm or less, for example.

Increasing the flatness of the flattened main surface(s) of the laminate can reduce unevenness of pressure applied to the laminate in the subsequent rigid pressing step.

Also, the thickness of the laminate is preferably reduced by, for example, about 30 µm or more and about 150 µm or less per main surface by the shaving. Shaving the main surface(s) of the laminate to such a degree reliably enables elimination of dents in the main surface(s) of the laminate formed in the isotropic pressing step.

FIG. 11 shows the cutting lines for flattening the main surface(s) of the laminate in the flattening step with dashed-and-dotted lines.

The cutting lines are in the outer green sheets 140 and are set such that a portion of each outer green sheet 140 remains on the laminate after the flattening step.

Figure 12:
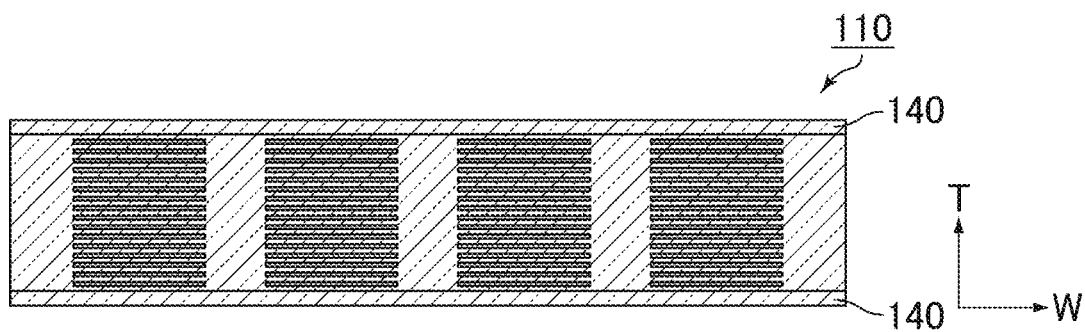
FIG. 12 is a cross-sectional view schematically showing a laminate flattened in a flattening step according to a preferred embodiment of the present invention.

FIG. 12 is a cross-sectional view schematically showing a laminate flattened in a flattening step.

Each of the main surfaces of the laminate 110 after the flattening is a flat or substantially flat surface.

Also, the internal electrode layers are not curved toward the center of the laminate in the lamination direction.

Subsequently, a rigid pressing step is performed which includes pressing the flattened laminate from both of the main surfaces with a rigid body on each of the main surfaces.

Figure 13:
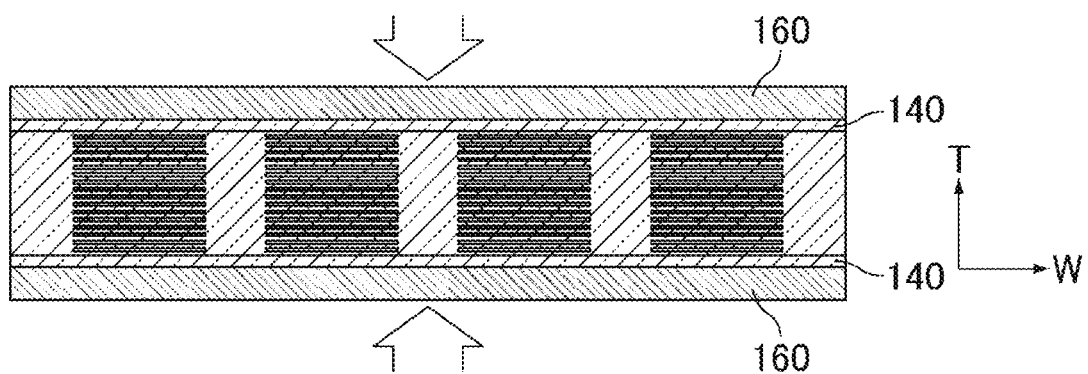
FIG. 13 is a cross-sectional view schematically showing a rigid pressing step according to a preferred embodiment of the present invention.

FIG. 13 is a cross-sectional view schematically showing a rigid pressing step.

A rigid body 160 is disposed on each main surface of the laminate 110, and the laminate is pressed from both of the main surfaces.

In the rigid pressing step, the laminate is pressed without using elastic sheets.

A metal mold, for example, is used as the rigid body. Preferably, a PET film is disposed between the mold (rigid body) and the laminate. The rigid pressing step may be performed by applying a release agent to the surface of each mold and pressing the laminate without PET films.

In the rigid pressing step, since the rigid bodies are not curved, no dents are formed in portions without the internal electrode layer in the laminate.

In the rigid pressing step for a flattened laminate, no voids are formed in the boundaries between the ends of internal electrode layers and the dielectric ceramic layers.

The above step enables production of a pressurized laminate without formation of voids in the boundaries between the ends of internal electrode layers and the dielectric ceramic layers.

The above step also enables formation of a laminate in which the internal electrode layers are not curved toward the center of the laminate in the lamination direction.

This laminate is cut and fired, so that fired laminates can be obtained.

The external electrodes are then formed on each of the laminates, such that multilayer ceramic electronic components can be obtained.

The cutting and firing of the laminate and the formation of external electrodes can each be performed by a known method.

The multilayer ceramic electronic components according to preferred embodiments of the present invention and the methods of producing multilayer ceramic electronic components according to preferred embodiments of the present invention have been described using a multilayer ceramic capacitor as an example. The multilayer ceramic electronic components according to preferred embodiments of the present invention are not limited to multilayer ceramic capacitors.

For electronic components other than multilayer ceramic capacitors, the ceramic defining the dielectric ceramic layers can be a piezoelectric ceramic such as, for example, a PZT-based ceramic, a semiconductor ceramic such as, for example, a spinel-based ceramic, or a magnetic ceramic such as, for example, ferrite.

An electronic component utilizing a piezoelectric ceramic defines and functions as a piezoelectric component, an electronic component utilizing a semiconductor ceramic defines and functions as a thermistor, and an electronic component utilizing a magnetic ceramic defines and functions as an inductor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminate including dielectric ceramic layers and internal electrode layers laminated together in a lamination direction; wherein
the laminate includes a first main surface and a second main surface that oppose each other in the lamination direction, a first side surface and a second side surface that oppose each other in a width direction perpendicular or substantially perpendicular to the lamination direction, and a first end surface and a second end surface that oppose each other in a length direction perpendicular or substantially perpendicular to the lamination direction and the width direction;
the internal electrode layers includes a first internal electrode layer that extends to the first end surface and a second internal electrode layer that opposes the first internal electrode layer with a dielectric ceramic layer in between and extends to the second end surface;
in a cross section of the laminate including the lamination direction and the width direction, no void is provided in a boundary between an end of each of the internal electrode layers in the width direction and the dielectric ceramic layer; and
in a cross section of the laminate including the lamination direction and the width direction, a flatness D1 is about 10 µm or less, where the flatness D1 is a flatness in the lamination direction of an outermost surface of an internal electrode layer at an outermost position of the laminate in the lamination direction and is measured along an entirety or substantially an entirety of the internal electrode layer in the width direction.

2. The multilayer ceramic electronic component according to claim 1, wherein in a cross section of the laminate including the lamination direction and the width direction, a ratio of a flatness D1 to a width W1 is about 0.10 or less, where the flatness D1 is a flatness in the lamination direction of an internal electrode layer at an outermost position of the laminate in the lamination direction and is measured along an entirety or substantially an entirety of the internal electrode layer in the width direction, and the width W1 is a width of the internal electrode layer.

3. The multilayer ceramic electronic component according to claim 1, wherein in a cross section of the laminate including the lamination direction and the width direction, a ratio of a step D2 to a width W1 is about 0.06 or less, where the step D2 is a distance between an outermost position and a position closest to the internal electrode layers in the lamination direction on the first main surface or the second main surface of the laminate, and the width W1 is a width of the internal electrode layer.

4. The multilayer ceramic electronic component according to claim 1, wherein in a cross section of the laminate including the lamination direction and the width direction, a step D2 is about 70 μm or less, where the step D2 is a distance between an outermost position and a position closest to the internal electrode layers in the lamination direction on the first main surface or second main surface of the laminate.

5. A multilayer ceramic electronic component comprising:
a laminate including dielectric ceramic layers and internal electrode layers laminated together in a lamination direction; wherein
the laminate includes a first main surface and a second main surface that oppose each other in the lamination direction, a first side surface and a second side surface that oppose each other in a width direction perpendicular or substantially perpendicular to the lamination direction, and a first end surface and a second end surface that oppose each other in a length direction perpendicular or substantially perpendicular to the lamination direction and the width direction;
the internal electrode layers include a first internal electrode layer that extends to the first end surface and a second internal electrode layer that opposes the first internal electrode layer with a dielectric ceramic layer in between and extends to the second end surface; wherein
in a cross section of the laminate including the lamination direction and the width direction, a ratio of a flatness D1 to a width W1 is about 0.10 or less, where the flatness D1 is a flatness in the lamination direction of an outermost surface of an internal electrode layer at an outermost position of the laminate in the lamination direction and is measured along an entirety or substantially an entirety of the internal electrode layer in the width direction, and the width W1 is a width of the internal electrode layer;
a ratio of a step D2 to the width W1 is about 0.06 or less, where the step D2 is a distance between an outermost position and a position closest to the internal electrode layers in the lamination direction on the first main surface or second main surface of the laminate; and
the step D2 is about 70 μm or less.

6. The multilayer ceramic electronic component according to claim 1, wherein the ratio of the flatness D1 to a width W1 is about 0.08 or less.

7. The multilayer ceramic electronic component according to claim 6, wherein the ratio of the flatness D1 to the width W1 is about 0.01 or more.

8. The multilayer ceramic electronic component according to claim 3, wherein the ratio of the step D2 to the width W1 is about 0.04 or less.

9. The multilayer ceramic electronic component according to claim 8, wherein the ratio of the step D2 to the width W1 is about 0.01 or more.

10. The multilayer ceramic electronic component according to claim 1, wherein in a cross section of the laminate including the lamination direction and the length direction, a flatness D3 is about 20 μm or less, where the flatness D3 is a flatness in the lamination direction of an internal electrode layer at an outermost position of the laminate in the lamination direction and is measured along an entirety or substantially an entirety of the internal electrode layer in the length direction.

11. The multilayer ceramic electronic component according to claim 10, wherein the flatness D3 is about 10 μm or less.

12. The multilayer ceramic electronic component according to claim 1, wherein in a cross section of the laminate including the lamination direction and the length direction, a ratio of a flatness D3 to a length l1 is about 0.10 or less, where the flatness D3 is a flatness in the lamination direction of an internal electrode layer at an outermost position of the laminate in the lamination direction and is measured along an entirety or substantially an entirety of the internal electrode layer in the width direction, and the length L1 is a length of the internal electrode layer.

13. The multilayer ceramic electronic component according to claim 12, wherein the ratio of the flatness D3 to the length L1 is about 0.08 or less.

14. The multilayer ceramic electronic component according to claim 13, wherein the ratio of the flatness D3 to the length L1 is about 0.01 or more.

* * * * *